United States Patent [19]

Powers, III

[11] Patent Number: 5,428,731
[45] Date of Patent: Jun. 27, 1995

[54] INTERACTIVE MULTIMEDIA DELIVERY ENGINE

[75] Inventor: John R. Powers, III, Monte Sereno, Calif.

[73] Assignee: Apple Computer, Inc., Cupertino, Calif.

[21] Appl. No.: 59,542

[22] Filed: May 10, 1993

[51] Int. Cl.⁶ ............................................. G09B 19/04
[52] U.S. Cl. ..................................... 395/154; 395/155
[58] Field of Search ............... 395/154, 161, 133, 152, 395/155

[56] References Cited

U.S. PATENT DOCUMENTS 5,111,409  5/1992  Gasper et al. .................. 395/154 X

OTHER PUBLICATIONS

Hypercard User's Guide (Trademark of Apple Computer, Inc.), 1988, pp. XXII, 6–11, 15, 31–34, 46×95–104.
Mastering Wordperfect 5.1×5.2 for Windows (Trademark of Sybex Inc.), 1992, pp. 68–69.
Mastering Windows 3.1 (Trademark of Microsoft Corporation), 1992, pp. 31–42×856.
Winkler, D. and Kamins, S. *Hypertalk 2.0: The Book* Table of Contents and 258–261 (1990).
N. Yankelovich et al. "Intermedia: The Concept and Construction of a Seamless Information Environment" Computer, vol. 21, No. 1, Jan. 1988, Long Beach US, pp. 81–96.
S. Ueda "Hypertext System: TownsGear" Fujitsu–Scientific and Technical Journal, vol. 26, No. 3, 1990 Kawasaki JP pp. 187–196.

Primary Examiner—Heather R. Herndon
Assistant Examiner—Cliff Nguyen Vo
Attorney, Agent, or Firm—Blakely, Sokoloff, Taylor & Zafman

[57] ABSTRACT

An engine for the interactive delivery and presentation of multimedia data. The delivery mechanism is premised on a topic and panel metaphor. A topic is comprised of a series of panels. Each panel further defines the multimedia data which will be used when the panel is displayed. Each panel may also contain control and qualifier elements which are used to determine the next panel to be displayed. Control elements are used to solicit information from the user. The information is then used by the qualifier elements in determining the next panel to be displayed. Each element is stored in a database as a discrete object. This allows sharing of objects amongst different panels or topics. Prior to delivery and presentation of the data, the topic must be set-up. Set-up occurs by retrieving all the necessary panel, control qualifier and data descriptor objects. The actual data associated with multimedia data objects is only retrieved when the data is to be displayed. The various qualifier objects are evaluated while panels are being viewed to determine the next panel to be displayed.

11 Claims, 15 Drawing Sheets

| LINE NO. | OBJECT DEFINITION | | | COMMENTS |
|---|---|---|---|---|
| 1. | acPT | 1100 | | This is the Topic object |
| 2. | (text) | 1120 | | Text content for Panel 1101 |
| 3. | (text) | 1121 | | Text content for Panel 1102 |
| 4. | (video) | 1140 | | Video content for Panel 1103 |
| 5. | ppUA | 1101 | | Definition of Panel 1101 |
| 6. | | pcTX | 1120 | Reference to text object for Panel 1101 |
| 7. | | pcCI | 1130 | Reference to checkbox for Panel 1101 |
| 8. | pcCI | | 1130 = checkbox ='VIDEO INSTRUCTIONS?' | Definition of checkbox control object |
| 9. | ppUA | 1102 | | Definition of panel 1102 |
| 10. | | pcTF | 1121 | Reference to text object for Panel 1102 |
| 11. | | pqCS | 1160 | Reference to Skip-If qualifier |
| 12. | pqCS | 1160 | | Definition of Skip-If qualifier |
| 13. | | pcCI | 1130 | Reference to checkbox as a condition |
| 14. | ppUA | 1103 | | Definition of panel 1103 |
| 15. | | pcMC | 1140 | Reference to video object for Panel 1103 |
| 16. | | pqCN | 1170 | Reference to Show-If qualifier |
| 17. | pqCN | 1170 | | Definition of Show-If qualifier |
| 18. | | pcCI | 1130 | Reference to checkbox as a condition |

Figure 12

INTERACTIVE MULTIMEDIA DELIVERY ENGINE

A portion of the disclosure of this patent document contains material which is subject to copyright protection. The copyright owner has no objection to the facsimile reproduction by anyone of the patent document or the patent disclosure, as it appears in the Patent and Trademark patent file or records, but otherwise reserves all copyright rights whatsoever.

BACKGROUND OF THE INVENTION

1. Field of The Invention

The present invention relates to the field of storage and retrieval of data, in particular, to organizing and storing multimedia data for use in interactive data delivery and display systems such as those used for instructional or educational purposes.

2. Description of The Related Art

As use of computer systems become more widespread, the desire to utilize multimedia has become more immediate. Multimedia refers to the integrated use of text, graphics, video and audio information media's. In order to effectively use multimedia, mechanisms for delivering the data to the user must be developed. For example, in order to create an interactive instructional application, various screens or panels are created which contain the instructional information. The panels must be logically linked and displayed in an order corresponding to the state of the interactive instruction.

Two known systems provide interactive multimedia delivery capabilities; Macro Media Director and HyperCard®. MacroMedia Director, a product of Macro Media Inc., use a score, stage, and cast metaphor to deliver interactive multimedia. A score (timeline) is used to place cast members (multimedia objects) on the stage (display). Objects can be layered visually by their placement along the vertical axis of the score and temporally by their placement along the horizontal axis. What the user sees at any point in time is represented by a column in the score. The flow of delivery (i.e. instruction) is controlled by the score. Scripts can be attached to cast members and the score to alter the flow of delivery. Scripts require processing external to the flow of delivery. Further, subsequent alterations to the flow are cumbersome.

HyperCard, a product of Apple® Computer, Inc. uses a notecard and object metaphor to deliver interactive multimedia instruction. Visual objects are placed on cards. The cards are then ordered. The flow of delivery is controlled by the card order. Scripts can be attached to visual objects and cards to alter the flow of instruction. A HyperCard card is equivalent to a column in the Macromedia Director score. A HyperCard object is equivalent to a cast member in MacroMedia Director. Both elements in both products can have scripts attached.

The prior art systems have various deficiencies. First, the flow of data delivery may only be altered via scripting. It would be desirable to be able to alter the flow of instruction inherently within the design of the instruction. Further, there is no backtracking once a flow of instruction has commenced.

Accordingly, it would be desirable to have an interactive multimedia delivery system which overcomes the foregoing deficiencies of the prior art.

SUMMARY

A delivery engine for interactive presentation and display of multimedia data is disclosed. The delivery mechanism is premised on a topic and panel metaphor. A topic is comprised of panels. Each panel defines the multimedia data which will be used when the panel is displayed. Each panel may also contain control and qualifier elements which are used to determine the next panel to be displayed. Control elements are used to solicit information from the user which is then used by the qualifier elements in determining the next panel to be displayed.

Each element is stored in a database as a discrete object. This allows re-use of objects amongst different panels or topics. Prior to delivery of the data, the topic must be set-up. Set-up occurs by retrieving all the necessary panel, control qualifier and data descriptor objects. The actual data associated with data media objects is only retrieved when the data is to be displayed. The various qualifier objects are evaluated while panels are being viewed.

The database is generated via an authoring step. In the authoring step, the topic and the various elements are combined to create a flow for the presentation of the multimedia data. Once the authoring is completed, the elements are processed in a manner similar to compiling a software program, to create the database.

BRIEF DESCRIPTION OF THE FIGURE

FIG. 5b illustrates the linkage between a topic and corresponding panels of the database of FIG. 5a.

FIG. 5c illustrates the linkage between a panel and corresponding visual objects and qualifiers of the database of FIG. 5a.

FIG. 12 is a listing of object definitions for implementing the topic illustrated in the example of FIGS. 11a–11c.

DETAILED DESCRIPTION OF THE PREFERRED EMBODIMENT

Figure 1:
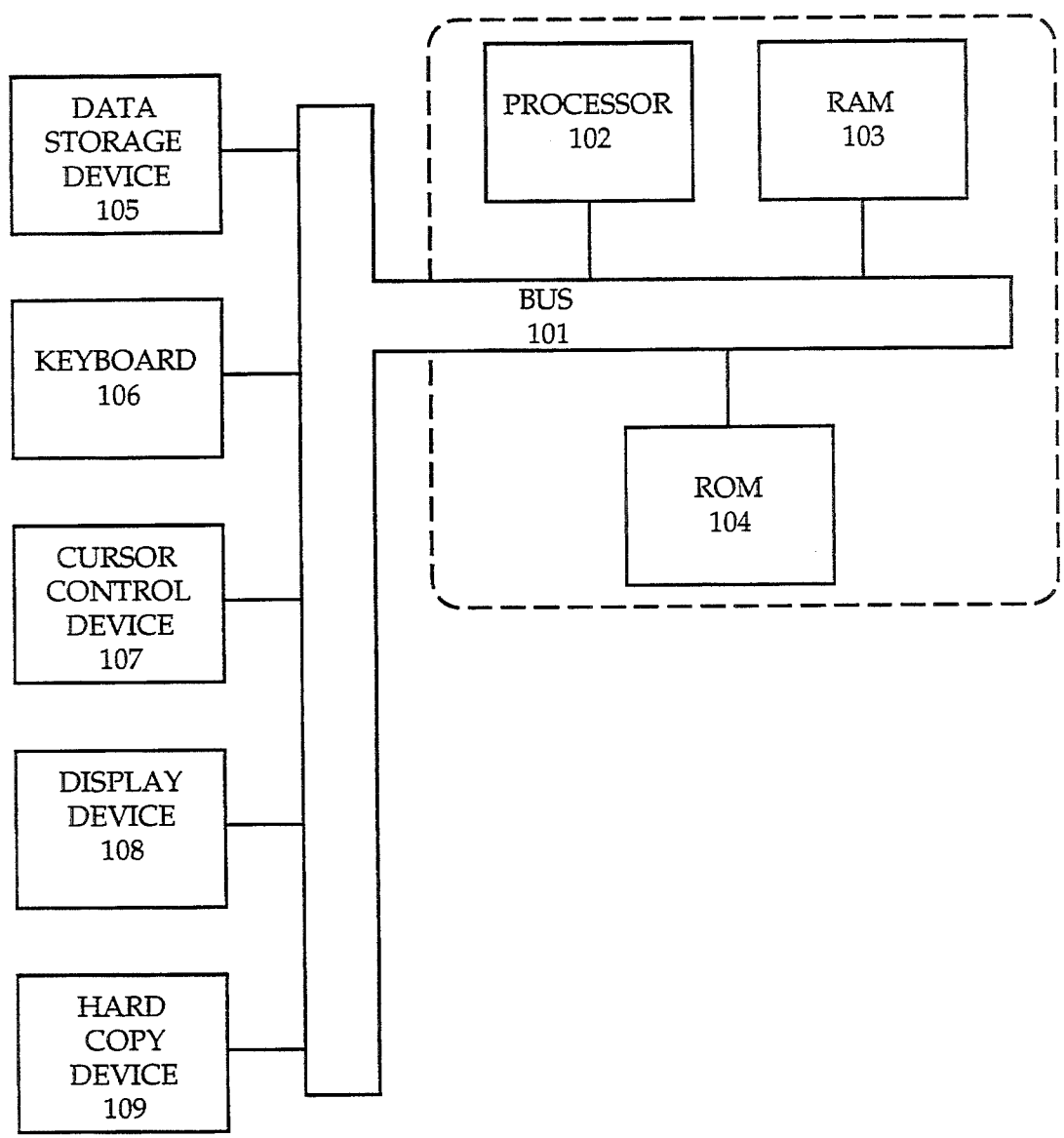
FIG. 1 is a block diagram illustrating the components of a computer system as may be utilized in the currently preferred embodiment of the present invention.

This specification is related to the following specifications which are assigned to the same assignee, Apple Computer, Inc.:

Ser. No. 08/010,063, filed Jan. 27, 1993, entitled "Method and Apparatus For Providing A Help Based Window System Using Multiple Access Methods"; Ser. No. 08/010,061, filed Jan. 27, 1993, entitled "Method and Apparatus For Displaying And Scrolling Data In A Window-Based Graphic User Interface"; Ser. No. 08/010,064 filed Jan. 27, 1993, entitled "Method and Apparatus For Presenting Information In A Display Using Floating Windows"; and Ser. No. 08/010,062, filed Jan. 27, 1993, entitled "Method and Apparatus For Providing Visual Cues In A Graphic User Interface" all still pending.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright Apple Computer, Inc.

An interactive multimedia instructional delivery engine is described. In the following description, numerous specific details are set forth such as coding examples, in order to provide a thorough understanding of the present invention. It will be apparent, however, to one skilled in the art that the present invention may be practiced without these specific details. In other instances, well-known circuits, for displaying text, graphics and video data have not been shown in detail in order not to unnecessarily obscure the present invention.

Overview of the Computer System of the Preferred Embodiment

The computer system of the preferred embodiment is described with reference to FIG. 1. The present invention is preferably implemented on a general purpose microcomputer such as one of the members of the Apple ® Macintosh ® family of computers. In any event, a computer system as may be utilized by the preferred embodiment generally comprises a bus or other communication means 101 for communicating information, a processing means 102 coupled with said bus 101 for processing information, a random access memory (RAM) 103 or other storage device 103 (commonly referred to as a main memory) coupled with said bus 101 for storing information and instructions for said processor 102, a read only memory (ROM) or other static storage device 104 coupled with said bus 101 for storing static information and instructions for said processor 102, a data storage device 105, such as a magnetic disk and disk drive, coupled with said bus 101 for storing information and instructions, an alphanumeric input device 106 including alphanumeric and other keys coupled to said bus 101 for communicating information and command selections to said processor 102, a cursor control device 107, such as a mouse, track-ball, cursor control keys, etc., coupled to said bus 101 for communicating information and command selections to said processor 102 and for controlling cursor movement, and a display device 108 coupled to bus 101 for displaying textual, graphical or video output. Additionally, it is useful if the system includes a hardcopy device 109, such as a printer, for providing permanent copies of information. The hardcopy device 109 is coupled with the processor 102 through bus 101. The computer system of FIG. 1 may also include means for processing and re-playing audio data (not illustrated).

The computer system illustrated in FIG. 1 is one that generally provides a window based graphical user interface which is well known (for example the Apple Macintosh family of computers, available from Apple Computers, Inc.), and hence, a detailed description is not necessary herein. In operation, the window based user interface of the currently preferred embodiment is generated and displayed using software stored in the RAM 103 or ROM 104 and executed by the processor 102, as is known.

As will become apparent in the description below, various computer elements provide the functionality described. For example, a Presentation Window would be displayed on the display device 108. The processor 102 would provide processing resources for the object generation means, evaluation of qualifiers, and other processing means comprising the delivery engine. The generated database would be stored in the data storage device 105 and loaded into the RAM 103 during the delivery process.

In the currently preferred embodiment the multimedia delivery engine is implemented as part of a Help facility for providing assistance in the operation of the computer system. It will be apparent from the description below, that the present invention's features and attributes have application in a wide variety of areas, e.g. for interactive presentations, instruction, game development or reference guides. Accordingly, the present invention is not limited by the following description of the currently preferred embodiment, and it will be understood by those skilled in the art, that the present invention may be applied to a computer systems offered by a variety of manufacturers, and to systems having both instructional and non-instructional uses.

Overview of the Delivery Engine

Figure 2:
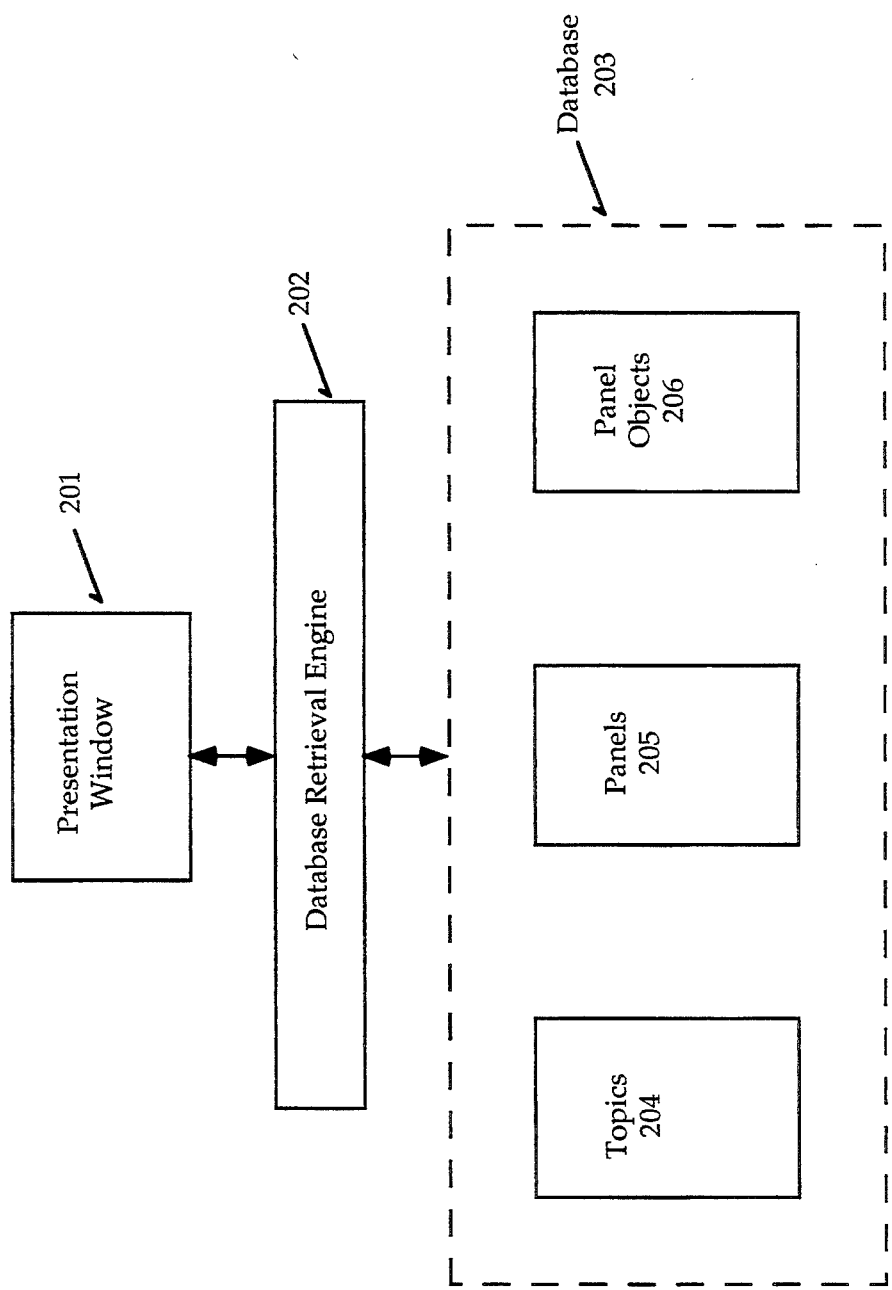
FIG. 2 is a block diagram illustrating the components of the delivery engine of the currently preferred embodiment of the present invention.

The delivery engine provides for the presentation of information using multiple media's. The currently preferred embodiment is in a Help system which provides user instruction. The instruction is organized as a series of topics. Each topic contains general topic information and references to panels. Each panel contains references to visual media such as text, graphics, video, as well as control and qualifier objects. The topics, panels, visual media, and qualifiers are all encapsulated as individual entities in a database. That is they are all objects in a database. FIG. 2 illustrates the basic components of the delivery engine and a presentation window of the currently preferred embodiment. The presentation window is a pre-defined window having various display controls and which are used for displaying the panel's visual media data. Referring to FIG. 2, a presentation window 201 is coupled to a database retrieval engine 202. The presentation window of the currently preferred embodiment is described in greater detail below. The database retrieval engine 202 operates responsive to current and prior operator input to retrieve from database 203, the next data to be displayed.

The database 203 contains a plurality of objects comprised of topic objects 204, panel objects 205 and panel objects 206. Generally speaking, the various objects are defined as follows:

| Topic | A series of Panels. |
|---|---|
| Panel | A collection of Panel Objects, Qualifiers and a display format which comprise what is seen by the user. |
| Panel Objects | Text, graphics and video data, controls, qualifiers and formats. |
| Controls | Standard Macintosh control items such as push-buttons, radio buttons and check boxes. Radio buttons and check boxes are used to get user input for conditional tests for qualifiers. |
| Qualifiers | Condition which are used to determine which panels will be displayed to the user. |
| Formats | Optional descriptors of how panel objects are displayed. |
| Movies | Animated graphical images with or without synchronized sound. |

In the currently preferred embodiment, objects may be used by more than one other object. This notion of re-use is one of the aspects of what is commonly referred to as object oriented programming. For example, a single item of text data may be used by multiple panels. The objects listed above are not meant to be exhaustive or limiting. Other objects could be implemented without causing departure from the spirit and scope of the present invention.

In the currently preferred embodiment, the C++ programming language is used. C++ is used because of it's inherent capability to support object oriented programming. However, it would be apparent to one skilled in the art to use alternative programming languages such as ADA or Modula-2, would not cause departure from the spirit and scope of the present invention.

Figure 3:
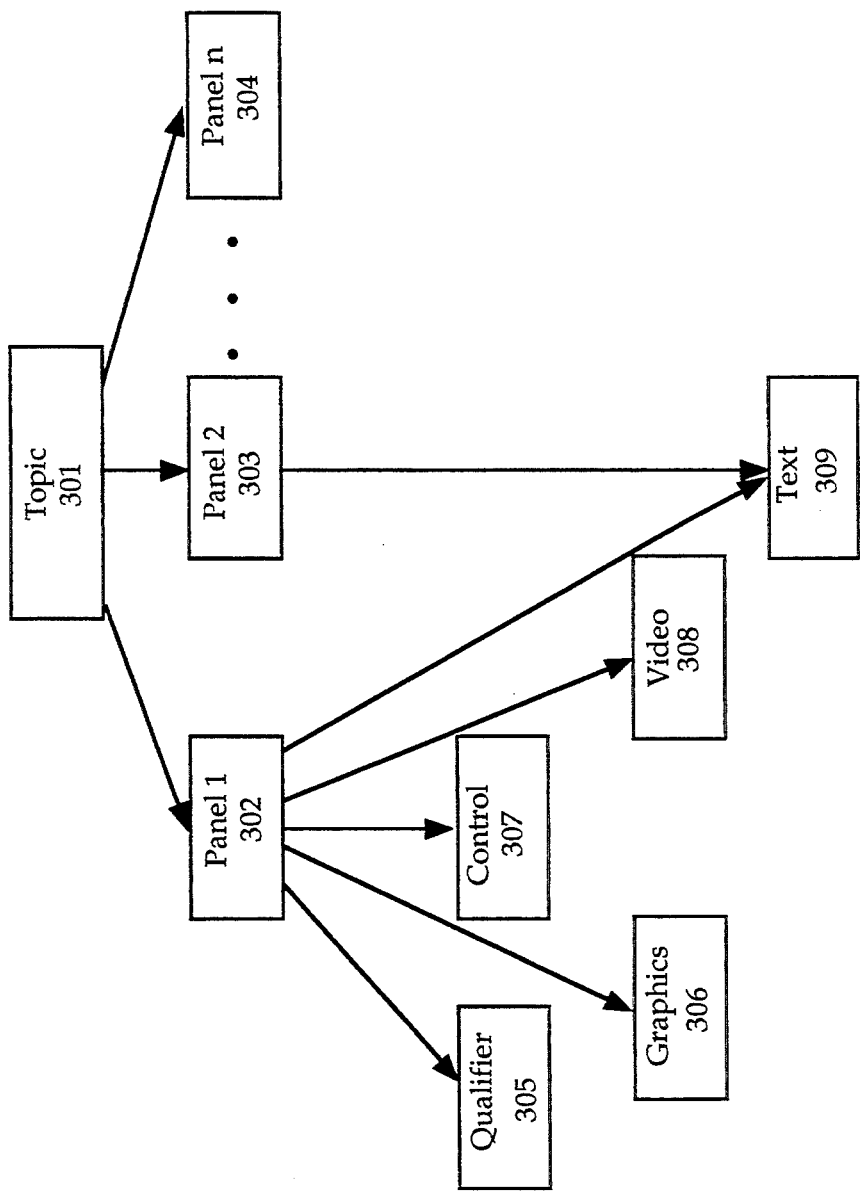
FIG. 3 is a diagram which illustrates the logical relationship amongst the database objects of the currently preferred embodiment of the present invention.

FIG. 3 illustrates the logical relationships between the objects in a database. Referring to FIG. 3 a topic 301 points to a series of panels, panel 1 302, panel 2, 303 and panel n 304. In FIG. 3, the panel 1 302 is linked to qualifier 305, graphics data 306, control 307, video data 308 and text data 309. Depending on the contents a particular panel may have none, one or multiples of the foregoing panel objects. Referring back to FIG. 3, the panel 2 303 is also linked to text data 309. Thus the text data 309 is displayed when either panel 1 302 or panel 2 303, is displayed.

Presentation Window

Figure 4:
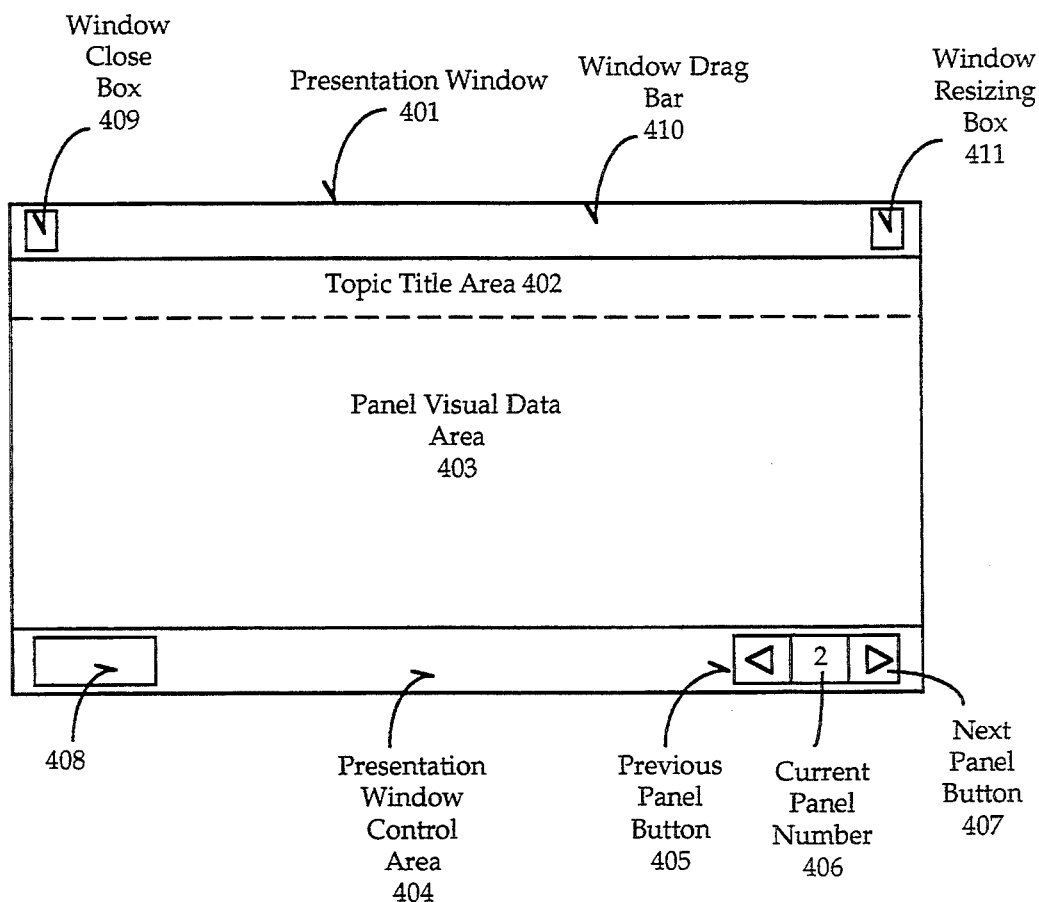
FIG. 4 illustrates a Presentation Window as may be utilized in the currently preferred embodiment of the present invention " © 1993 Apple Computer, Inc." (17 U.S.C. 401).

A presentation window as may be utilized in the currently preferred embodiment is illustrated in FIG. 4. Referring to FIG. 4, a presentation window 401 includes a topic title area 402 and a panel visual data area 403. The topic title area 402 will contain the name of the topic being viewed. The panel visual data area 403 will contain the visual data that is associated with the panel being viewed. It is the panel visual data area 403 to which the data delivery engine will provide data for display. In the currently preferred embodiment, the panel visual data area 403 is 340 pixels wide. The length is determined by the objects on the panel and the size of the screen. A panel with lots of text will be longer than a panel with little text. The panel consists of any number of graphic, text, prompt, control and video objects. The only limit to the number of objects on a panel is the RAM available.

The objects are drawn in the panel in the order specified in the panel object. As a result, objects later in the sequence can be made to overlay previous objects in the sequence. Text can be positioned in four different ways on a panel; tag, body, full panel and author positioned. Tag, body and full panel text are positioned by the delivery engine. Tag text is typically right justified in a bold font type. Body text is typically left justified with a normal font type. Full panel text is used when only text will appear on the panel. Additional formats may be created, stored in the database, and used. Text, graphic, video (movie) and control data positions are determined by parameters in the object definition stored in the database.

The presentation window 401 further contains a presentation window control area 404. The control area 404 provides means for traversing through the instruction path and includes a previous panel button 405 and a next panel button 407. Activation of these buttons, typically by a point and click operation, causes backward (button 405) and forward (button 407) traversal through the series of panels comprising the topic. A current panel number indicator 406 allows the user to know what panel that they are currently viewing. Up to three (3) additional controls may be added to the control area 404, e.g. the control button 408. The controls may be for altering the flow of the presentation of panels (e.g. switching topics.) These optional controls are stored in the database. The topic defines whether or not they should appear. The delivery engine retrieves and places the optional controls in the control area 404.

Finally, the presentation window 401 includes window control areas that are familiar to those who use window based graphical user interfaces. Window drag bar 410 allows the presentation window to be re-located via a cursor drag operation. Window re-sizing box 411 allows the size of the window to be shrunk/expanded as desired. Window close box 409 provides a quick means for closing the window and thus terminating the instruction (help) session.

Database Overview

The present invention operates responsive to initial user queries for data. Once the initial query is made, the present invention operates to retrieve data for display in a presentation window. The relationship of the various objects in the database is further illustrated in FIGS. 5a-5c.

Figure 5A:
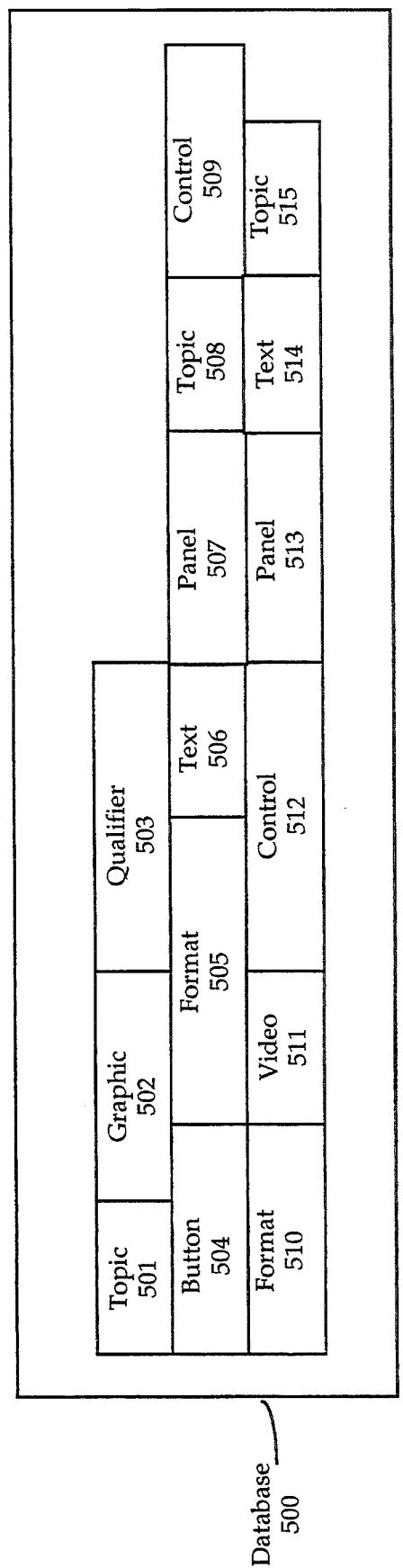
FIG. 5a is a block diagram of a database as generated in the currently preferred embodiment of the present invention.
Figure 5B:
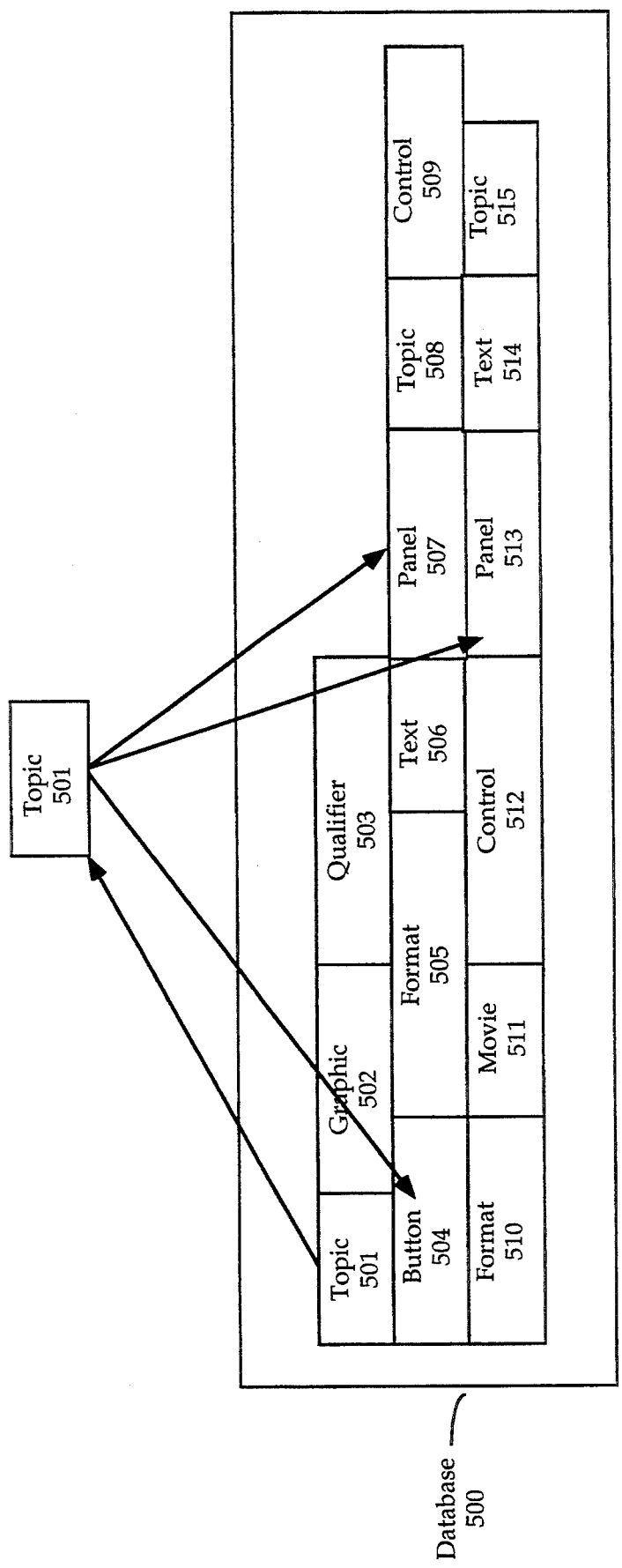
Figure 5C:
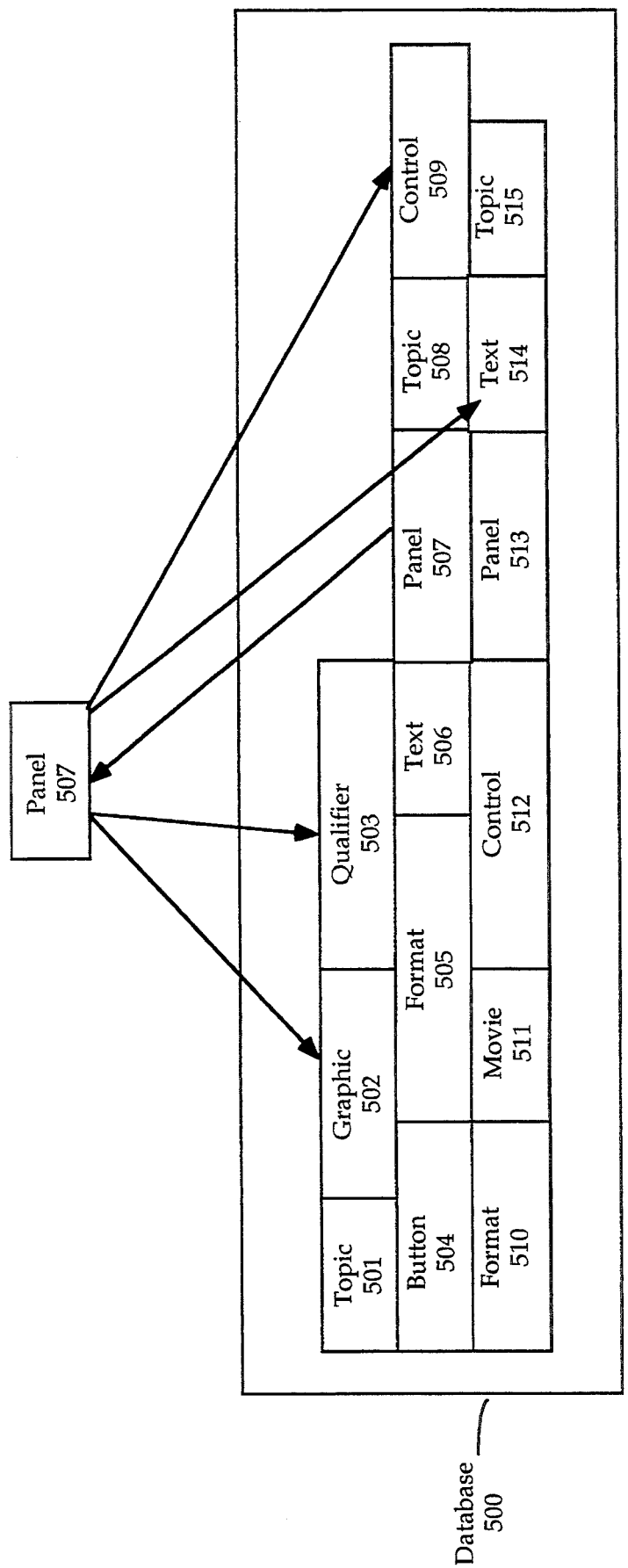

Referring to FIG. 5a, a database 500 is illustrated with Topics 501, 508 and 515, Graphic object, 502, Qualifier Object 503, Button 504, Panels 507 and 513, Control object 509 and 512, Format objects 505 and 510 and Text Objects 506 and 514. FIG. 5b illustrates a linkage of Topic 501 with panels 507 and 513 and button 504. Finally, FIG. 5c illustrates the linkage of Panel 507 and graphic object 502, Qualifier 503, Control Object 509 and Text Object 514. The manner in which these linkages are made will become apparent in the description below.

Generating the Database

As described above, the database is comprised of a plurality of data objects. Generation of the database is essentially a two step process; authoring and object generation. This is analogous to writing and compiling a software program. Authoring is similar to writing a program or a script. In this case, authoring is used to generate the topic contents. The topic contents are then provided to an object generation means for creation of the objects for entry into the database. The object generation means performs a step that is similar to compilation. The database itself is analogous to an object file created during compilation.

In the currently preferred embodiment, various authoring tools may be used. In one instance the topic contents may be generated as a set of instructions. The topic contents may also be generated via a What You See Is What You Get (WYSIWIG) tool. In this case, the panels are generated as they would be displayed. Of course different object generation means would be used for each instance. Other techniques for creating the topic contents used to generate the database would be apparent to one skilled in the art and would not depart from the spirit and scope of the present invention.

The database is conceptually comprised of resources and data. The resources are the data objects. The data is the actual text, graphical or video data that is displayed. Data objects are retrieved by an object type and an identification number ("id"). In the currently preferred embodiment, the object type is a 4-character string and the object id is an integer number. Table A lists a set of "building-block" data objects that are available for the presentation window in the currently preferred embodiment of the present invention. The list is not meant to be exhaustive, but merely representative of commonly used objects.

TABLE A

| Category | Type | Label | Description |
|---|---|---|---|
| DATA OBJECTS LIST | | | |
| Topic | acPT | kResTopic | Topic script |
| Panel | ppUA | kResPanel | Panel |
| Content | pcTX | kResSTxt | Text |
| Content | pcTF | kResSTxtF | Full panel text |
| Content | pcTB | kResSTxtB | Body text |
| Content | pcTT | kResSTxtT | Tag text |
| Content | pcGA | kResGraphic | Graphic |
| Content | pcGF | kResGraphicF | Full panel graphic |
| Content | pcPR | kResPrompt | Prompt |
| Content | pcCI | kResCtrlItem | Control item |
| Content | pcMO | kResMovie | Movie |
| Content | pcMC | kResMovieC | Movie with controller |
| Qualifier | pqCN | kShowIf | Show panel if conditions are true. |
| Qualifier | pqCS | kSkipIf | Skip panel if conditions are true. |
| Qualifier | pqMS | kResMakeSure | Make sure the conditions are true before showing this panel. If not, show the Oops topic. |
| Qualifier | pqCN | kResCondition | Condition |
| Context | pxCA | kResContext | The specification for a context check. |

In the currently preferred embodiment, each object is defined as a Macintosh resource. A Macintosh resource is code or data that may be used by various applications. Macintosh resources as described in the publication entitled "Inside Macintosh Volume 1" published by Addison-Wesley Publishing Company, Inc. The actual resource definition for many of the objects described in Table A is provided in Appendix A. These resource definitions are exemplary of how the resource may be defined and is not meant to be exhaustive.

Referring back to Table A, the first column Category indicates the general category of the data object, namely, Topic, Panel, Content, Action, Qualifier or Context. The second column Type lists the object type. The third column is the object label. The object label is an alternative way to reference the object and is used by the authoring tools and by the delivery engine implementation code (C++). Finally, the fourth column is a brief description of the use for the particular object.

Operation of the Delivery Engine

Figure 6:
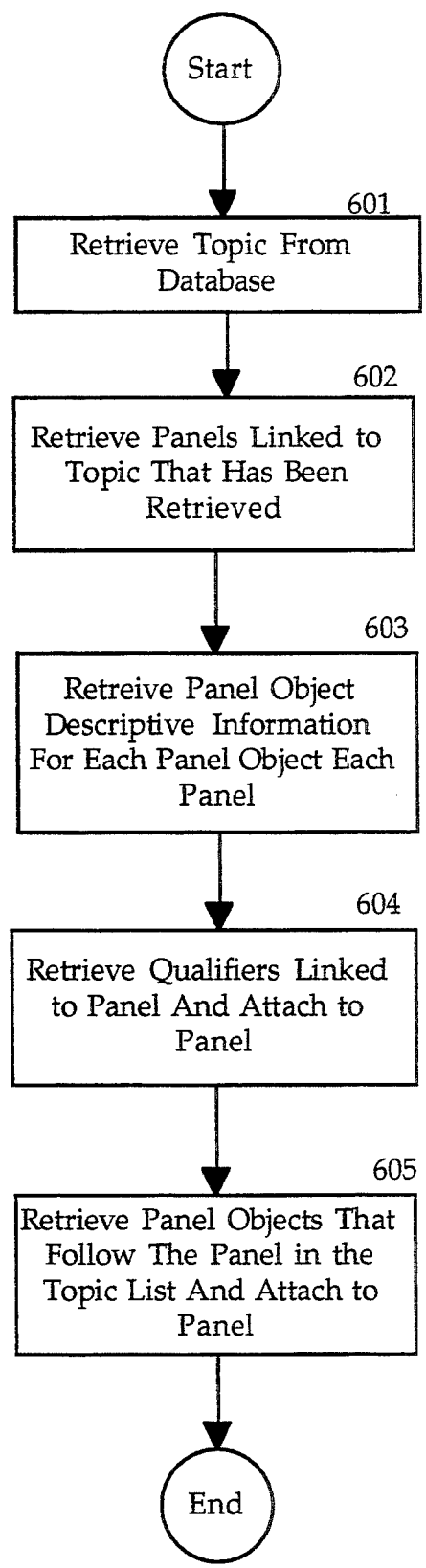
FIG. 6 is a flowchart which illustrates the steps retrieving objects for setting up a topic for delivery in the currently preferred embodiment of the present invention.

In the currently preferred of the present invention, elements are used only when they are needed. Before starting the instruction (displaying panels), the delivery engine must set-up the topic to be viewed. The steps for setting-up a topic are described with respect to the flowchart of FIG. 6. Referring to FIG. 6, the topic is retrieved from the database and is instantiated as an object, step 601. By instantiating as an object it is meant to create an instance of its class. The topic object contains general topic information and a list of panels associated with the topic. Each panel that is linked to the topic (i.e. in the topic's list of panels) is then retrieved from the database and also instant jared as an object, step 602. The retrieved panels each contain a list of panel objects. Each panel object is then retrieved from the database and instantiated as an object, step 603. Only the panel object description itself is retrieved and instant jared, not the content of the panel object. For example, a text panel object contains a reference to the text content and the location or format of the text on the panel. The text content is not retrieved until the panel is displayed.

Next, each qualifier linked to the panel is retrieved and instantiated as an object, step 604. The qualifier is attached to the panel object as a collaborator. A collaborator is an independent object that works to support, aid or assist another object. Finally, if any panel objects follow the panel in the topic list (as distinguished from the panel list), they are retrieved and instantiated as objects, step 605. These objects are appended to the panel that was previously instantiated. This allows a panel descriptor to be modified within the topic. For example, prompts can be appended to a panel from the topic. At this point the topic of instruction is ready to be delivered.

Figure 7:
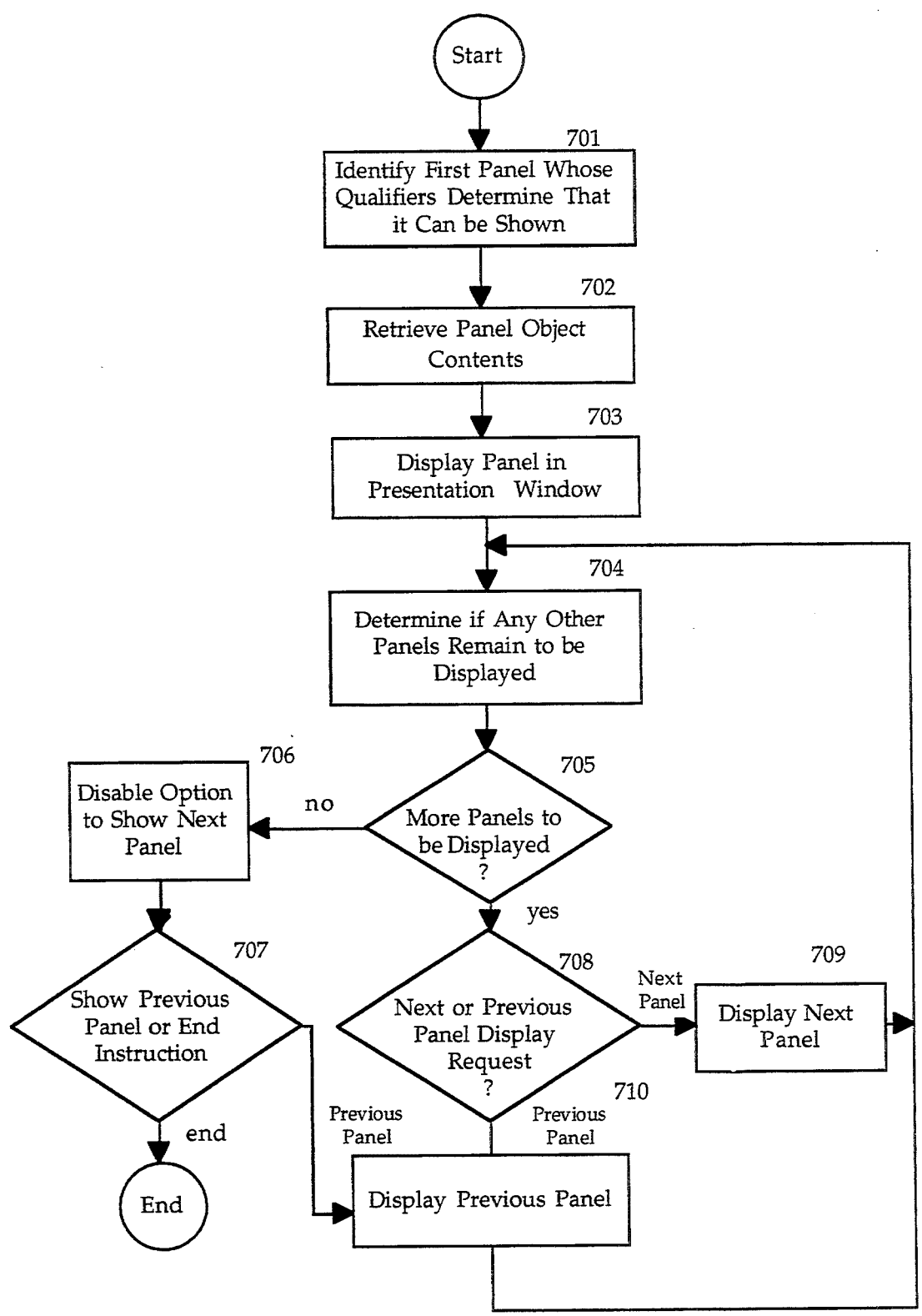
FIG. 7 is a flowchart which illustrates the steps retrieving objects for delivery of panels in the currently preferred embodiment of the present invention.

The delivery of panels in the during the course of instruction is described with respect to the steps of the flowchart in Figure. Referring to FIG. 7, once all the panels and panel objects have been retrieved and instantiated, the delivery sequence begins with the first panel whose qualifiers determine that it can be shown or which has no qualifiers step 701. The manner in which the qualifiers are examined is described below with reference to FIGS. 8 and 9. Here it is assumed that a first panel has been identified. The panel object contents are then retrieved, step 702. As noted above, only the panel object descriptors were initially retrieved. The panel object contents are the text, graphics or video data that is to be displayed on the panel. Once the panel contents are retrieved, they are displayed in the panel display area of the presentation window, step 703. In this display step, the display of the objects may be formatted by the author or by the delivery engine by the author's choice of object type for the data.

At this point, a panel is displayed and the author may provide the user with various options. One option that an author may provide to the user is a go-back option. In the go-back option the user may jump back to a previously displayed panel. The go-back option is described below in more detail with respect to FIG. 10. The other options are to traverse backwards or forwards through the current list of panels which is described as follows. These options are provided as part of the presentation window functionality (see FIG. 4). Referring back to FIG. 7, a determination is made by the delivery engine whether or not there are any more forward (next) panels to be displayed, steps 704, 705. This determination is made transparent to the user while they are examining the current panel. If no more panels are to be displayed in the forward direction, the "next" option is disabled, step 706. In this instance, the user options are limited to showing a previous panel or to end the instruction, step 707. If the user chooses to end instruction, the instruction is terminated. Otherwise, the previous panel is displayed, step 710.

Responding in the affirmative to the question of more panels to be displayed of step 705 causes the "next" and "previous" options to be enabled. The user must respond by selecting one of the options, step 708. If the "next" option is selected, the next eligible panel is displayed, step 709. The next eligible panel is identified by the state of the qualifiers associated with the next successive panels (or by the lack of qualifiers for a panel). The delivery engine then repeats the process by determining if any other panels remain to be displayed (step 704). If the previous option is selected, the previous panel is displayed, step 710 and the process repeats with the delivery engine determining if any other panels remain to be displayed (step 704).

From the foregoing description it is apparent that the delivery engine maintains a display list of panels that have been displayed. This display list facilitates the traversing of the panels using the go-back option and the make-sure qualifier (as will be described below).

Evaluation of Qualifiers

The qualifiers that may be associated with a panel facilitate the interactive nature in which the panels of a topic may be displayed. The qualifiers and the conditions referred to therein provide for control of its flow of panel display. Qualifiers are evaluated by the delivery engines before each panel is shown and in the background while the user is not interacting with the delivery engine. Qualifiers can be based on user controls within any panel, not necessarily the one being currently shown, or on a test of the user's context. For example, if the instruction is to display a short cut technique for performing a function or a long way technique for performing a function, a user may be given the option of deciding which way they want to learn to perform the function in a panel X. Assume that the panels for the instruction are linked sequentially as panels X through panels X+m. Further assume that the panels X+1 to X+n show the short cut technique, while the panels X+n +1 to X+m show the long way technique. If the user at panel X chooses the to proceed by learning the long way technique, the panels X+1 to X+n (corresponding to the short cut technique) would have qualifiers which would cause them to be skipped.

Figure 8:
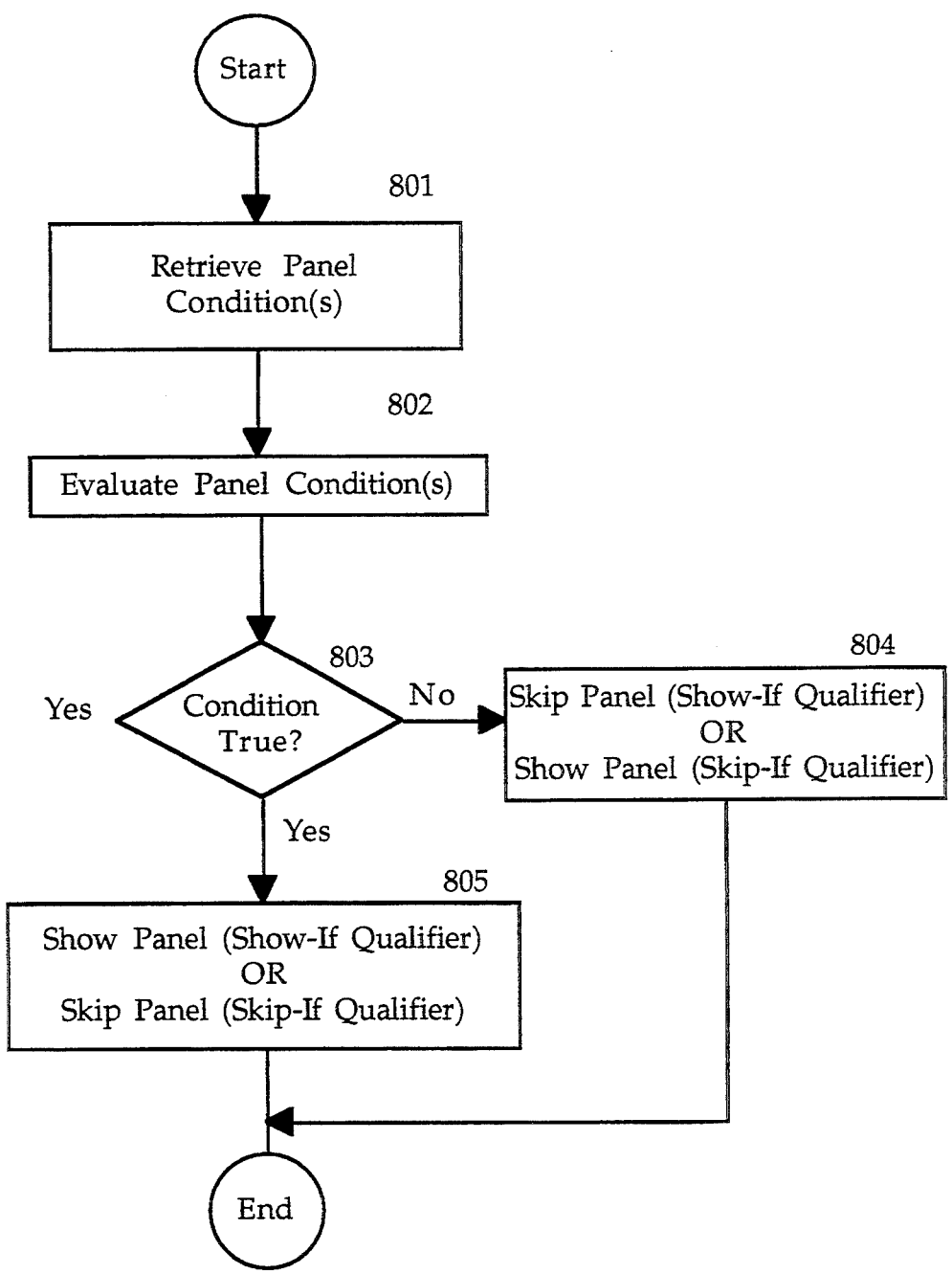
FIG. 8 is a flowchart which illustrates the steps taken during the evaluation of a Show_If or Skip_If qualifier in the currently preferred embodiment of the present invention.
Figure 9:
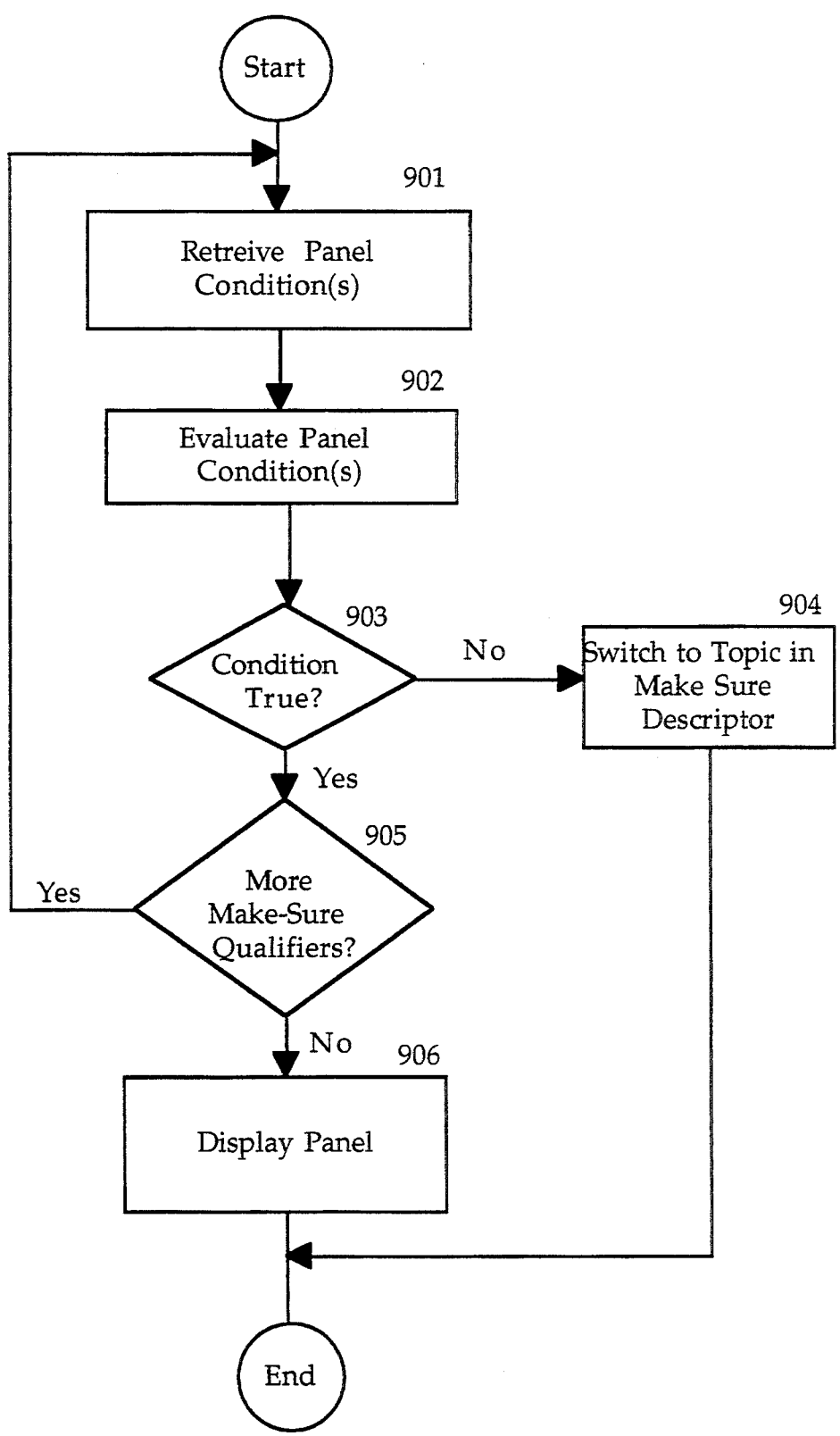
FIG. 9 is a flowchart which illustrates the steps undertaken for evaluating a Make-Sure qualifier in the currently preferred embodiment of the present invention.

The evaluation for the show-if and skip-if qualifiers is described with reference to FIG. 8. Referring to FIG. 8, if the panel has a Show-If or Skip-If qualifier, retrieve the condition for the qualifier from the database and instantiate it as an object, step 801. The condition is then evaluated, steps 802, 803. The condition may consist of a user control, a context check, or another condition. These elements are paired with and/or logic (author's choice) and can be nested indefinitely. Hence, the Show-If or Skip-If qualifier is a binary decision tree. The tree is evaluated. If the eventual result is false, the panel will be skipped (Show-If) or shown (Skip-If), step 804. If the eventual result is true, the panel will be shown (Show-If) or skipped (Skip-If), step 805.

A third qualifier is the Make-Sure qualifier. The Make-Sure qualifier provides for the switching of topics (e.g. for remedial instruction or a notice that the user must go back to a prior step) and as the criteria checked for in a go-back operation. The former instance of the Make-Sure qualifier is described with reference to FIG. 9. First, the conditions for the qualifier are retrieved from the database and instantiated it as an object, step 901. The retrieved panel conditions are then evaluated, step 902 and 903. The condition is evaluated in the same way as the Show-If or Skip-If, but the result is used differently. If the result is false, another topic is automatically shown, step 904. The identification of which topic is to be shown is contained in the Make-Sure descriptor (See Appendix A for description). The first Make-Sure qualifier that yields a false result has its topic shown. If the result is true, then a check is made for additional Make-Sure qualifiers, step 905. If more Make-Sure qualifiers exist for the panel, they are evaluated per step 901. If there are no further Make-Surer qualifiers and all the Make-Sure qualifiers associated with the panel have evaluated to true, the panel may be shown, step 906.

Figure 10:
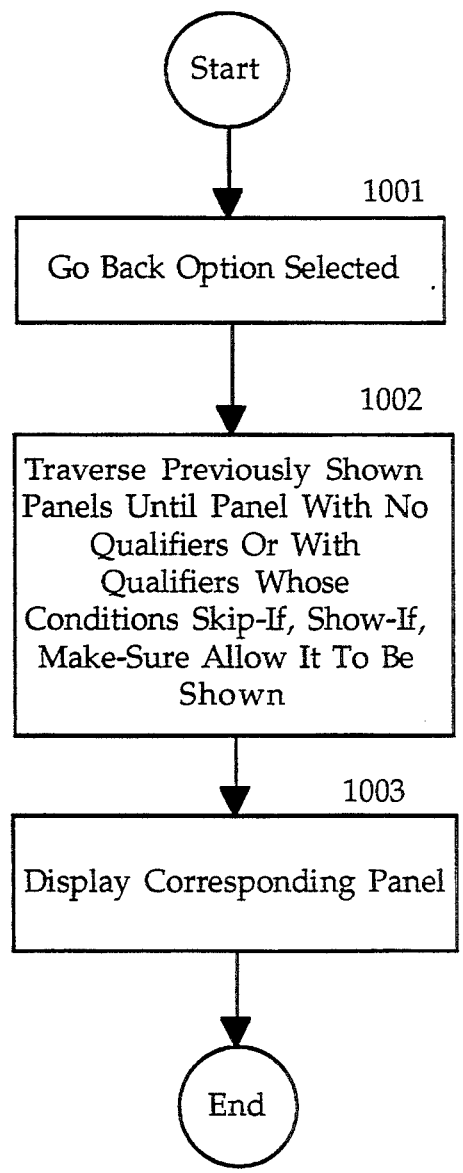
FIG. 10 is a flowchart which illustrates the steps taken by the delivery engine responsive to a user invoking a Go-Back option in the currently preferred embodiment of the present invention.

The Make-Sure qualifier as used with the go-back option is described with reference to FIG. 10. Referring to FIG. 10, the user is presented with a "go-back" option by the author and the user elects to take it, step 1001. In this instance, the panels previously shown are searched in reverse order until a panel is found with no qualifiers or with qualifiers whose conditions (Skip-If, Show-IF, Make-Sure) allow it to be shown, step 1002. The panel is then displayed, step 1003. The Make-Sure qualifier allows an author to specify a set of conditions (a Make-Sure) which, if changed, automatically provide a warning. The engine can then search back to find where in the sequence the conditions were acceptable, allowing the user an opportunity to redo the conditions correctly.

Context checking is an optional element of a conditional operation. Note that a condition can specify one or more combinations of the following:
A panel control item such as a radio button or checkbox
A context-check specification
Other conditions.

A context-check specification is a resource (object) which, when evaluated in light of the user's context, results in a true or false. For example, checking for an open "window" is a context-check specification. Other context checks which can be performed in the currently preferred embodiment include:
Window <title> is open and front;
Window <title> is open but invisible;
Application <name> is open <running>;
Application <name> is open and in front.

Switching of Topics

As noted above, topics may be switched via the Make-Sure option of a panel. Moreover, in the currently preferred embodiment, multiple topics can be shown simultaneously. The author may elect to present a new topic while still displaying the old topic, close the old topic and replace it with a new one, or hide the old topic and show a new one (called an "Oops" topic). A hidden topic is automatically shown again when the "Oops" topic is closed. This is made possible by a displayed panel list maintained by the delivery engine.

Of course, whenever a topic switch the topic set-up described with reference to FIG. 6, must be performed.

Example

Figure 11A:
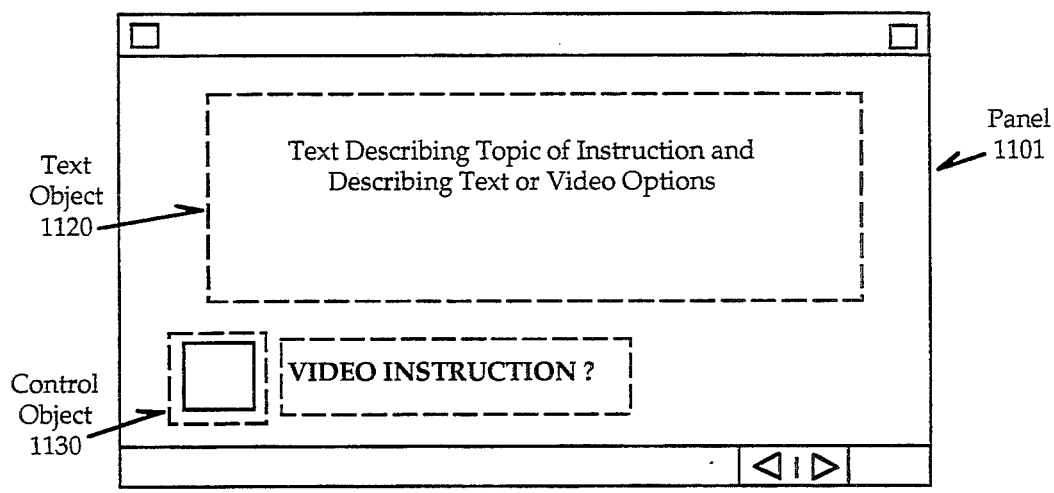
FIGS. 11a–11c represent an example of a topic comprising three panels that may be utilized in the currently preferred embodiment of the present invention "1993 Apple Computer, Inc." (17 U.S.C. 401).
Figure 11B:
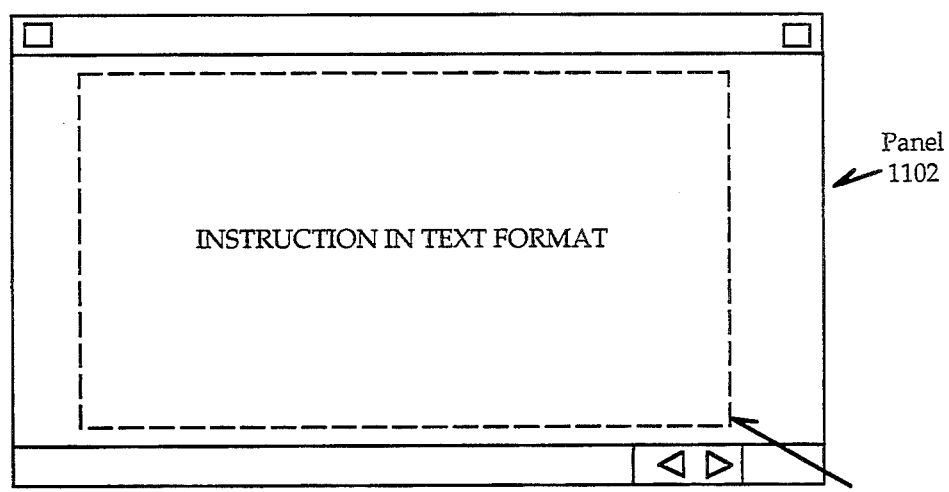
Figure 11C:
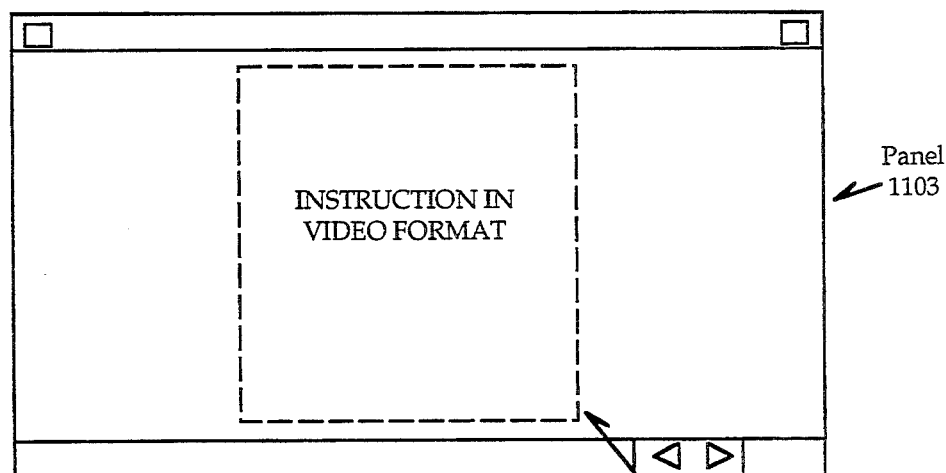

An example of the present invention is now provided. FIGS. 11a–11c are the panels for a topic to be authored. In this example, instruction for performing certain operations on a computer system is being provided. Here, the instruction may alternatively be provided via textual instructions or via a video showing the instruction being carried out. So if the instruction was for closing a window, the user has the option of reading how to maneuver the cursor to point to a close box and then clicking a button on the cursor control device, or simply watching the action being performed.

Referring to FIG. 11a, a panel 1101 has two objects; a text object 1120 and a control object 1130. The text object 1120 will contain the text which describes the topic of instruction. The control object 1130 is a checkbox by which a user may specify that they desire video instruction. FIG. 11b illustrates a panel 1102 which has one object namely a full panel text object 1121 which describes how to perform the desired operation. FIG. 11c illustrates a panel 1103 which has one object, namely a video object which is a move which shows the desired operation being carried out.

Assuming that topic set-up has occurred, the panel 1101 will be displayed. The user is presented with the option of having the instruction by text or video. Video instruction is specified by checking the VIDEO INSTRUCTION checkbox. Upon going to the next panel via the panel traversal operators of the presentation window, the panel 1102 will be displayed if the checkbox is not checked and the panel 1103 will be displayed if the checkbox is checked.

FIG. 12 contains pseudo-code exemplary of how the foregoing example may be encoded using the objects described in Table A above. Referring to FIG. 12, line 1 contains the topic object definition. Lines 2–4 contain the definition of the panel object contents, i.e. the text and the video data. Line 5 starts the definition of panel 1101. The objects associated with panel 1101 are on lines 6 and 7 (indented for clarity), a text object and checkbox object, respectively. Line 8 contains the definition for the checkbox control object. Note that whereas the checkbox object is referenced by panel 1101, it is defined outside of the object. This allows the checkbox object to be utilized my multiple panels. Further note that the panel object contents may also be defined within the panel definition in which the object is used.

Line 9 begins the definition of panel 1102. The panel 1102 includes a text object and Skip-If qualifier object, lines 10 and 11, respectively. At line 12, the qualifier object linked by panel 1102 is defined. Note that the Skip-If qualifier object links to the checkbox object as a condition (line 13).

Line 14 begins the definition of panel 1103. The panel 1103 includes a video object and a Show-If Qualifier object, lines 15 and 16, respectively. Finally, the Show-If qualifier object is defined at lines 17-18. As in the case of the Skip-If qualifier, the Show-If qualifier links to the checkbox object as a condition (line 18).

Figure 13:
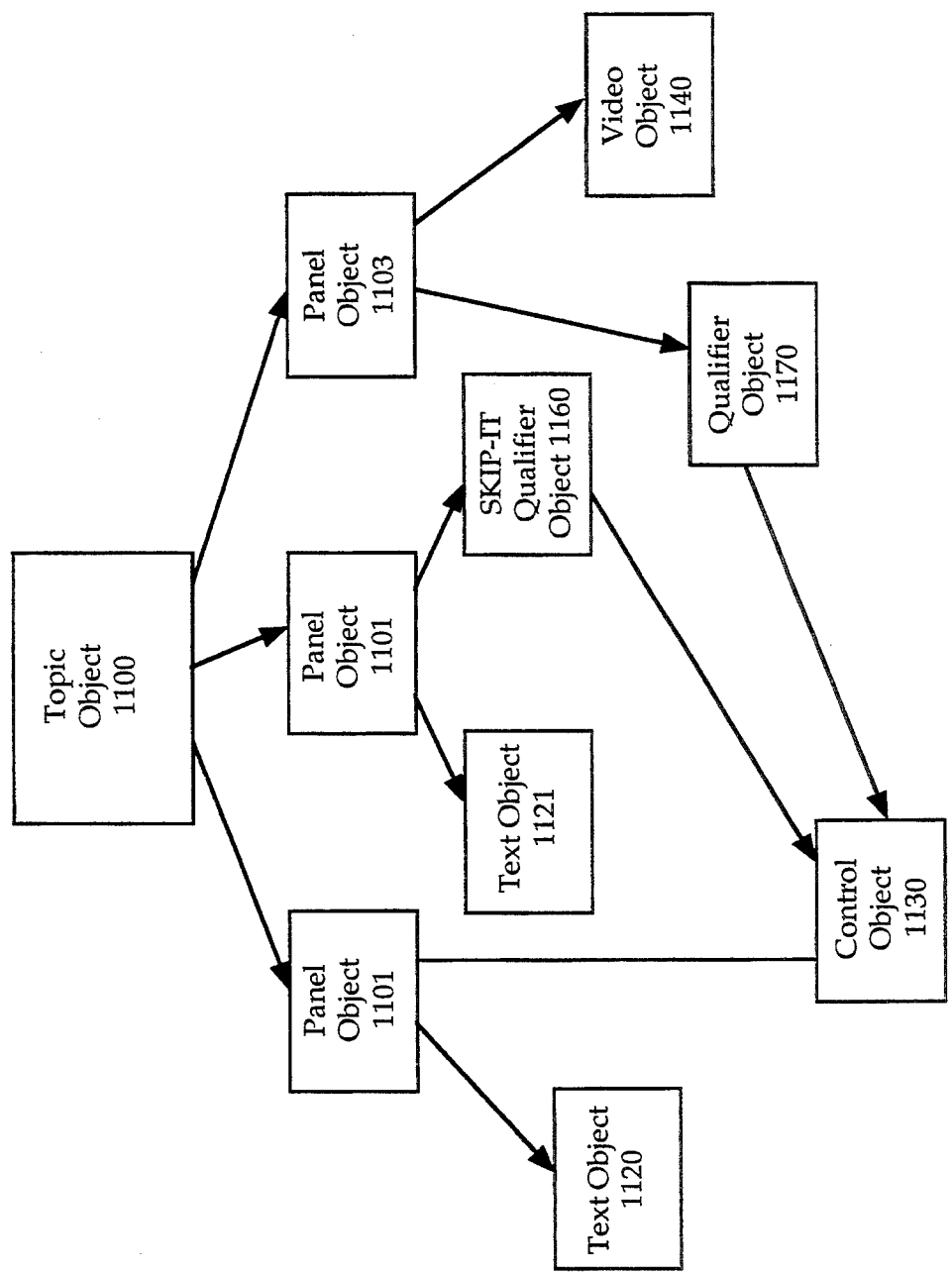
FIG. 13 illustrates the linkage between the objects of the example of FIGS. 11–11c.

FIG. 13 illustrates the linkages between the objects in the example. Referring to FIG. 13, the topic 1100 would be linked to the panels 1101, 1102 and 1103. The panel 1101 would have links to the text 1120 and control 1130. As is apparent, multiple objects will link to the control 1130. The panel 1102 links to text object 1121 and Skip-IF qualifier 1160. The qualifier 1160 in turn links to the control 1130. Finally, the panel 1103 links to video object 1140 and to Show-If qualifier 1170. The Show-If Qualifier in turn links to control 1130.

During set-up of the topic, the objects are loaded as described above with reference to FIG. 6. Delivery of the panels would then occur in the manner as described with reference to FIGS. 7-10.

Thus, a method and apparatus for interactive delivery of multimedia data for display on a computer system, is described.

I claim:

1. A method for interactive delivery of multimedia data in a computer controlled display system, said method comprising the steps of:
    a) authoring a topic, said topic comprised of a series of sequentially-linked panels, media elements, and flow control elements;
    b) generating a database from said topic, said database comprised of a plurality of topic, panel, media and flow control objects;
    c) setting-up said topic for display by retrieving said topic, panel, media and flow control objects from said database;
    d) identifying a first panel to be displayed by performing the following steps:
        i) examining a first panel in said series of sequentially linked panels to determine if said first panel has at least one flow control object;
        ii) if said first panel in said series of sequentially linked panels does not have a said flow control object, identifying said first panel as the first panel to be displayed;
        iii) if said first panel in said series of sequentially linked panels does have a flow control object, evaluating said flow control object:
        iv) if said flow control object yields a first state, identifying said first panel as the first panel to be displayed:
        v) if said flow control object yields a second state, skipping said panel: and
        vi) continuing steps i)-v) for said series of sequentially linked panels until a panel is found which either has no flow control object or said flow control object yields said first state
    e) retrieving the media content for said first panel to be displayed;
    f) displaying said first panel;
    g) identifying a second panel to be displayed by evaluating said flow control objects;
    h) retrieving the media content for said second panel to be displayed; and
    i) displaying said second panel.

2. The method as recited in claim 1 wherein said step of evaluating said flow control objects is further comprised of the steps of:
    a) identifying conditional elements associated with said flow control elements;
    b) determining logical values of said conditional elements;

c) performing any necessary logical operations on said logical values to derive a state for said flow control objects.

3. The method as recited in claim 1 wherein said step of identifying a second panel to be displayed by evaluating said flow control objects is further comprised of the steps of:
   a) identifying flow control objects associated with a next panel in said series of sequentially linked panels;
   b) identifying conditional elements associated with said flow control elements;
   c) determining logical values of said conditional elements;
   d) performing any necessary logical operations on said logical values to derive a state for said flow control objects;
   e) repeating steps a)-d) until a panel having flow control objects in said first state is identified.

4. The method as recited in claim 1 wherein said flow control object further causes a topic switch when said flow control object is evaluated to be in said second state.

5. A computer display system having a central processing unit (CPU) coupled to a display, comprising:
   topic authoring means for creating a topic, said topic comprised of a series of panels, each of said panels further comprised of panel elements;
   database generation means for generating a database from a topic, said database comprised of a plurality of topics, panels and panel objects wherein said panel objects include video objects, text objects, graphics objects, qualifier objects and condition objects;
   topic delivery means for delivering said panels of a topic for display in an order based on user input and further based on context wherein said topic delivery means includes object retrieval means for retrieving objects from said database for setting-up delivery of said topic, qualifier evaluation means for determining a logical state for said qualifier objects, and next panel determination means for determining the next panel to be displayed based on the logical state of said qualifier objects for succeeding panels; and
   media content retrieval me,ms for retrieving media data corresponding to panel objects for display on said display.

6. The computer display system as recited in claim 5 wherein said topic delivery means is further comprised of:
   topic switching means for switching topics responsive to a first qualifier object for a panel being displayed being in a first predetermined logical state.

7. The computer system as recited in claim 6 is further comprised of panel listing means for maintaining an ordered list of panels previously displayed.

8. The computer system as recited in claim 5 is further comprised of panel display formatting means for specifying the arrangement of display of media data on a panel.

9. The computer system as recited in claim 5 wherein said topic authoring means is a What You See Is What You Get application.

10. In a computer controlled display system, a method for interactive display of multimedia data comprising the steps of:
   a) organizing multimedia data to be displayed into a topic comprised of a sequence of panels;
   b) for each panel, specifying multimedia elements and flow control elements linked to said panel;
   c) generating a database from said topic to create a set of topic objects, panel objects, multimedia data objects and flow control objects;
   d) retrieving objects corresponding to a topic to be viewed; and for each panel in said sequence of panels perforating the steps of:
   e) determining that a panel can be displayed based on the state of flow control objects linked to said panel including
      i) identifying a panel display qualifier associated with a panel;
      ii) determining the state of condition indicators associated with said panel display qualifiers:
      iii) evaluating the state of said panel display qualifier based on the associated condition indicators:
      iv) if said panel display qualifier is in a first state, identifying said panel as capable of display: and
      v) if said panel display qualifier is not in said first state, identifying said panel as not capable of display; and
   f) displaying the multimedia elements for said panel.

11. The method as recited in claim 10 wherein said flow control objects are comprised of panel display qualifiers and condition indicators, said step of determining that a panel can be displayed based on the state of flow control objects linked to said panel is further comprised of the steps of:
   a) identifying a panel display qualifier associated with a panel;
   b) determining the state of condition indicators associated with said panel display qualifiers;
   c) evaluating the state of said panel display qualifier based on the associated condition indicators;
   d) if said panel display qualifier is in a first state, identifying said panel as capable of display; and
   e) if said panel display qualifier in not in said first state, identifying said panel as not capable of display.

* * * * *